United States Patent Office 3,825,617
Patented July 23, 1974

3,825,617
METHOD FOR STARTING UP AN ALKYLATION SYSTEM
George L. Hervert, Woodstock, Ill., assignor to Universal Oil Products Company, Des Plaines, Ill.
No Drawing. Continuation-in-part of abandoned application Ser. No. 117,158, Feb. 19, 1971. This application Mar. 16, 1973, Ser. No. 342,107
Int. Cl. C07c 3/54
U.S. Cl. 260—683.48                              4 Claims

ABSTRACT OF THE DISCLOSURE

A process for starting up an isobutane-olefin alkylation unit to produce an alkylation reaction product from isobutane and a $C_3$–$C_5$ olefin using hydrogen fluoride catalyst. The alkylation reactor, settler, and isobutane stripper are dried by recycling isobutane therethrough at the rate used during alkylation operations. Circulation of fresh, substantially pure hydrogen fluoride through the reactor and settler is then started, the isobutane recycle rate to the reactor is reduced to a low level, olefin feed is charged to the reactor, and the reactor temperature is maintained at about 115° F. to 200° F. for about 0.1 hour to about 48 hours. During this period of high temperature, low isobutane recycle operation, the hydrogen fluoride is diluted to about 90 weight percent purity with soluble organic compounds. The reactor temperature is then reduced to about 50° F. to about 110° F., the isobutane recycle rate is increased to the original level, and normal alkylation operations are commenced.

CROSS-REFERENCE TO RELATED APPLICATIONS

This application is a continuation-in-part of my copending application Ser. No. 117,158, filed Feb. 19, 1971, now abandoned.

BACKGROUND OF THE INVENTION

This invention concerns a method for starting up a hydrogen fluoride alkylation unit to produce an alkylation reaction product from isobutane and a $C_3$–$C_5$ olefin. More particularly, this invention relates to a method for commencing operation of an alkylation unit to produce high octane motor fuel alkylate from isobutane and a $C_3$–$C_5$ olefin using hydrogen fluoride catalyst, without production of low octane alkylation reaction products during the initial operation of the unit.

Alkylation of isoparaffinic hydrocarbons, such as isobutane and isopentane, with mono-olefinic hydrocarbons, such as propylene, butylenes and amylenes, is well known as a commercially important method for producing gasoline range hydrocarbons. The isoparaffinic $C_5$–$C_{10}$ hydrocarbons typically produced by the alkylation reaction are termed "alkylate." Alkylate is particularly valuable as motor fuel blending stock because of its generally high motor and research octane ratings. Alkylate is thus normally employed in motor fuel production to improve the overall octane ratings of available gasoline boiling range hydrocarbons. A continuing goal in the art is to provide an alkylate product having higher octane ratings than can be produced in conventional alkylation operations.

A commercial hydrogen fluoride alkylation system includes an alkylation reactor wherein the hydrogen fluoride catalyst, isobutane and olefins are admixed and reacted, a settler wherein the mixture formed in the reactor is separated into a hydrocarbon phase and a catalyst phase, and an isobutane stripper wherein the hydrocarbon phase formed in the settler is fractionated to remove the $C_5$ and heavier alkylate hydrocarbons as bottoms and to recover isobutane overhead for recycle to the reactor. The catalyst phase formed in the settler is normally recycled directly to the alkylation reactor. Commercial alkylation units also include other conventional apparatus such as catalyst regeneration means, propane strippers, hydrogen fluoride strippers, receiving vessels, pumps, etc., the further discussion of which is not essential to an understanding of the present invention since their use will be obvious to those skilled in the art.

In conventional operation of commercial alkylation units, particular procedures are typically followed to start up the units, not only at the time operations are begun immediately after construction of the units, but also after any routine or emergency shutdown of the units when alkylation operations are halted completely. For example, since isobutane and olefins employed as feed to an alkylation unit are conventionally obtained from other petroleum refining operations, such as catalytic cracking units it is often necessary to shut down completely commercial alkylation units when another refinery unit is shutdown for any reason. As used herein, the term "starting up" refers to a procedure for bringing a commercial alkylation unit from a condition of complete inoperativeness to a state of continuous alkylation operation corresponding in general to the hydrocarbon processing capacity of the particular alkylation unit, at any time when the catalyst contains more than about 95 weight percent hydrogen fluoride at the time operations are commenced.

Conventionally, the method employed to start up a commerical alkylation unit is relatively simple. First, isobutane is charged to the unit and passed continuously through the alkylation reactor, the settler and the isobutane stripper and then recycled to the alkylation reactor, in order to dry out the alkylation apparatus before the fresh, substantially pure hydrogen fluoride is introduced. Drying is accomplished in general by passing a fraction of the isobutane in circulation through molecular sieve dryers or other drying means well known in the art. Isobutane is continuously charged to the unit, until the rate of continuous recycle of isobutane from the isobutane stripper is about equal to the rate of isobutane recycle maintained during normal, continuous alkylation operation of the unit. After analysis of the circulating isobutane indicates that the alkylation apparatus is sufficiently dry, and the isobutane recycle rate from the isobutane stripper to the alkylation reactor reaches about the level employed in continuous alkylation operations, hydrogen fluoride is then charged to the alkylation apparatus and continuously circulated through the alkylation reactor and settler in admixture with isobutane recycled from the stripper. When first introduced to the alkylation apparatus, the hydrogen fluoride is essentially pure acid, and is essentially free from water and hydrocarbon diluents which are normally present in the catalyst during continuous alkylation operations, The hydrogen fluoride is separated from the isobutane in the settler and recycled directly to the alkylation reactor, while the isobutane is passed from the settler to the isobutane stripper and, from the stripper, is recycled back to the reactor. Sufficient relatively pure hydrogen fluoride is charged to the unit to provide a continuous circulation of hydrogen fluoride from the settler into the reactor of about 1 to about 2 volumes of hydrogen fluoride per hour for each volume of isobutane recycle per hour into the reactor from the isobutane stripper. This rate of circulation of hydrogen fluoride corresponds to the conventional circulation rate maintained during continuous alkylation operation of the unit. Continuous introduction of $C_3-C_5$ olefin feed into the alkylation reactor is then commenced at a rate sufficient to provide an isobutane/olefin mole ratio in the alkylation reactor of about 10:1 to about 20:1. The temperature of the alkylation reactor is conventionally maintained at about 50° F. to about 110° F., generally by indirect heat exchange between the catalyst-hydrocarbon mixture and cooling water in the reactor. The octane rating of the alkylate produced at higher temperatures is low so that internal cooling of the reactor or other cooling is required in commercial units in order to absorb the heat released in the exothermic alkylation reaction.

When conventional methods for starting up an alkylation unit are employed, including the use of fresh, substantially pure hydrogen fluoride, it had been found that the quality of the alkylate produced is relatively low for at least the first several weeks of operation. One manifestation of the low quality of alkylate produced for at least several weeks after any start up of an alkylation unit is the low octane rating of the alkylate, which is typically several numbers lower than the rating of alkylate produced subsequent to this initial period of operation. Since a typical alkylation unit may produce 5,000 barrels per day of alkylate, or more, it is apparent that the low octane alkylate produced initially after start up invariably results in significant economic loss while low octane alkylate production continues. The process of the present invention for starting up a commercial alkylation unit provides a convenient and economical method for producing high octane alkylate in the initial period of operation after starting up, as well as in latter operations, thereby overcoming the problem of initial low octane alkylate production experienced in prior art operation of such units.

SUMMARY OF THE INVENTION

An object of this invention is to provide a method for starting up a commercial alkylation unit to produce high octane motor fuel alkylate.

Another object of this invention is to provide a method for starting up an alkylation unit to provide a uniformly high quality alkylate in initial operation as well as in subsequent periods of operation of conventional alkylation units.

In an embodiment, the present invention relates to a process for starting up a commercial hydrogen fluoride alkylation system to produce an alkylation reaction product from isobutane and a $C_3-C_5$ olefin using hydrogen fluoride catalyst, which comprises the steps of: (a) drying the alkylation unit at drying conditions which include continuously passing isobutane into elements of the alkylation unit comprising an alkylation reactor, a settler and an isobutane stripper and recycling isobutane from the stripper to the reactor at an isobutane recycle rate about equal to the isobutane recycle rate maintained at alkylation conditions in said unit; (b) continuously circulating hydrogen fluoride through the reactor and the settler at a rate of about 1 volume to about 2 volumes per volume of isobutane recycled to the reactor at the isobutane recycle rate employed in step (a), separating hydrogen fluoride from isobutane in the settler, recycling hydrogen fluoride from the settler to the reactor, and reducing the isobutane recycle rate to the reactor to about 5 volume percent to about 50 volume percent of the isobutane recycle rate employed in step (a); (c) continuously introducing a $C_3-C_5$ olefin into the reactor for about 0.1 hour to about 48 hours at a rate sufficient to provide an isobutane/olefin mole ratio of about 1:1 to about 5:1 in the reactor while maintaining a temperature of about 115° F. to about 200° F. and maintaining the same hydrogen fluoride and isobutane recycle rates as in step (b); (d) reducing the temperature in the reactor to a level of from about 50° F. to about 110° F., increasing the isobutane recycle rate to the reactor from the isobutane stripper to the level employed in step (a), maintaining the same rate of circulation of hydrogen fluoride and rate of introduction of the olefin to the reactor as employed in step (c), and commencing continuous alkylation operation of the alkylation unit.

DETAILED DESCRIPTION OF THE INVENTION

The method of the present invention is applicable to all commercial alkylation units which utilize hydrogen fluoride to catalyze an alkylation reaction of isobutane with $C_3-C_5$ olefins. The butene isomers are particularly preferred for use as the olefin in the process of the present invention. The conventional operation of such commercial alkylation units is well understood by those skilled in the art. It is thus intended that, unless hereinafter specified otherwise, conventional isobutane and $C_3-C_5$ olefin feed stocks, conventional operating parameters for continuous alkylation operation (after start up), and conventional equipment normally utilized in commercial alkylation units may all be employed in the accustomed manner in any particular unit when practicing the method of this invention.

The first essential step in starting up an alkylation unit using the method of the present invention is to dry the unit by charging isobutane into the alkylation apparatus to be employed. Although the drying operation is discussed with reference only to an alkylation reactor, settler and isobutane stripper, it will be apparent to those trained in the art that other apparatus is also dried by circulation of isobutane, including receivers, hydrogen fluoride strippers, propane strippers, etc., in a well known manner not essential to understanding of the present method. The term "reactor," as utilized herein, includes a reaction soaker, if one is included in a particular unit. The design and use of such reaction soakers are described in U.S. Pat. 3,560,587 and U.S. Pat. 3,607,970. In the drying step employed in the present method, isobutane is charged continuously into the alkylation reactor and passed into the settler and the isobutane stripper. Isobutane is continually recycled to the reactor until the recycle rate increases to a level about equal to the isobutane recycle rate from the stripper to the reactor which is maintained during continuous alkylation operation of the particular unit. In any particular alkylation unit, the isobutane recycle rate is maintained at a certain relatively constant level during ordinary running of the unit, in order to provide a suitable excess of isobutane in the reactor relative to olefin. The rate of isobutane recycle maintained and alkylation conditions and the rate achieved in the drying step, are thus dependent on the olefin feed rate normally employed and the size of the particular unit. Under typical continuous operating conditions, the isobutane recycle rate is about 10 moles, or more, per mole of olefin feed utilized. Thus, sufficient isobutane is charged to the unit during the drying step, in the method of this invention, to provide an isobutane recycle rate to the reactor equivalent to the amount which would produce an isobutane/olefin molar ratio of about 10:1 in the reactor if olefin were charged to the reactor at the standard rate for the particular unit. The drying operation is continued until the apparatus is dried and the isobutane recycle rate is about 10 times the planned rate of olefin feed to the unit, or more, on a molar basis. Since the olefin feed as well as the fresh isobutane feed to any particular unit is normally dried using apparatus provided for that purpose in conventional operations, drying apparatus is generally available in a conventional alkylation unit. Drying is normally accomplished by passing a fraction of the isobutane circulating in the unit through the drying apparatus and back into circulation. Analysis of the isobutane in circulation is made at various times over a period of generally about 1 to about 2 weeks. When the amount of water contained in the circulating isobutane is lowered to a level of about 50 to about 100 p.p.m., the drying phase of start up is considered to be completed.

When drying is completed, the circulation of isobutane through the reactor, settler and isobutane stripper is continued and the introduction of fresh substantially pure hydrogen fluoride into the alkylation reactor-settler system is commenced. Fresh, substantially pure hydrogen fluoride (e.g., about 95 wt. percent or more hydrogen fluoride) is introduced into the system and circulated through the reactor and settler. Since isobutane is simultaneously recycled to the reactor, isobutane and hydrogen fluoride tend to mix in the reactor and are separated into separate hydrocarbon and acid phases in the settler. The hydrogen fluoride phase is recovered and passed directly back into the reactor and isobutane is passed to the isobutane stripper. The introduction of hyrogen fluoride into the reactor-settler system is continued until the continuous volume rate of circulation of hydrogen fluoride from the settler into the reactor is at least equal (by volume) to the rate of isobutane recycle to the reactor from the isobutane stripper. Generally, it is preferred to charge sufficient hydrogen fluoride to the reactor-settler system to provide a circulation rate to the reactor from the settler, during circulation of the hydrogen fluoride, of about 1 to about 2 times, by volume, the rate of isobutane recycle to the reactor from the stripper. It is intended, in general, to charge sufficient fresh hydrogen fluoride to any particular alkylation unit in this step to provide essentially all the catalyst requirements of the particular unit needed for continuous alkylation operation of the unit. The catalyst/hydrocarbon volume ratio desired at normal alkylation conditions in a particular alkylation unit will thus determine the approximate total amount of catalyst to be charged to a particular reactor-settler system in any particular embodiment of the present process.

When the desired amount of hydrogen fluoride has been placed in continuous circulation through the reactor and settler, the rate of continuous recycle of isobutane from the isobutane stripper to the reactor is cut back to about 5 volume percent to about 60 volume percent of the rate maintained during the drying step and during the introduction of the hydrogen fluoride. In general, it may be desirable to continue to pass isobutane through the isobutane stripper at the relatively high rate achieved in the drying step and maintained during the introduction of hydrogen fluoride, while simultaneously reducing the rate of isobutane recycle to the alkylation reactor. This can be accomplished by simply introducing about 50% to about 95% of the isobutane removed overhead from the stripper either directly into the settler or directly recycling back into the stripper at an intermediate point in the stripper column. Alternatively, sufficient isobutane can be withdrawn to storage, or other use, from an alkylation unit to reduce the rate of continuous isobutane recycle from the stripper to the reactor to the desired low level.

After circulation of hydrogen fluoride is established and the rate of recycle of isobutane to the reactor from the stripper is cut back to a level of about 5 volume percent to about 50 volume percent of that used in normal alkylation operations and drying operations, continuous introduction of the $C_3$–$C_5$ olefin feed into the alkylation reactor is begun. The olefin is charged to the alkylation reactor at the conventional rate used during normal, continuous alkylation operation of the particular unit utilized. Since the rate of isobutane recycle to the reactor is maintained at a low level during this period, an isobutane/olefin mole ratio of about 1:1 to about 5:1 will result as opposed to the 10:1 or higher mole ratio maintained during normal continuous alkylation operation of a unit, based on the relative rate of introduction of olefin and isobutane into the reactor. Hydrogen fluoride is maintained in constant circulation through the reactor and settler during this period of low isobutane recycle operation, at about the rate employed in normal continuous alkylation operation of the particular unit. The hydrogen fluoride and hydrocarbons charged to the reactor during this low isobutane recycle rate operation are thoroughly admixed to form an emulsion at a hydrogen fluoride/hydrocarbon volume ratio of about 5:1 or more, on contrast to conventional continuous operations, wherein the acid/hydrocarbon volume ratio in the reactor is maintained at 1:1 to about 2:1. The mixture formed in the reactor during the low isobutane recycle operation is continuously passed to the settler and separated into a hydrocarbon phase and a catalyst phase. The catalyst phase is returned to the reactor and the hydrocarbon phase is passed to the isobutane stripper. In this initial period of olefin charge to the reactor, during which a low rate of isobutane recycle to the reactor from the stripper is maintained, the temperature in the reactor is held between about 115° F. and about 200° F. Preferably, a temperature of about 125° F. to about 175° F. is maintained in the reactor during this initial period of olefin charge. Since heat removal means are generally an integral part of commercial alkylation reactor-settler system, the method of maintaining the desired temperature in a particular reactor will be obvious to those skilled in the art. This high temperature, low isobutane recycle operation is continued for a period of 0.1 hour to about 48 hours. During this mode of operation, little or no high quality alkylate product is produced in the unit. However, the concentration of essential organic components in the hydrogen fluoride catalyst is built up during this period at an extremely rapid rate. This is in contrast to conventional start up methods, in which the essential organic components of the hydrogen fluoride catalysts are built up only at a very slow rate, requiring several weeks, or more, of operation of the unit in order to achieve the desired level. It is desirable to continue the high temperature operations in the present method until the strength of hydrogen fluoride circulating in the reactor-settler system is reduced from essentially pure hydrogen fluoride, e.g. 95 weight percent or more, to a level of about 90 weight percent or less of hydrogen fluoride, the remainder of the catalyst being made up of organic materials rapidly produced during the high temperature step. A 90 weight percent acid level can usually be achieved in the present process in about 2 hours to about 24 hours of high temperature, low isobutane recycle operation of the unit. A contact time between catalyst and hydrocarbons in the reactor of about 10 minutes to about 60 minutes is preferably utilized during this high temperature operation, with a reactor contact time of about 20 minutes to about 40 minutes especially preferred.

After about 0.1 hour to about 48 hours of operation at the high temperature, low isobutane recycle level described hereinbefore, the rate of isobutane recycle to the alkylation reactor is increased to the normal recycle rate maintained at continuous alkylation conditions in the particular unit. Thus, the recycle rate of isobutane from the isobutane stripper to the alkylation reactor is increased to a level sufficient to provide an isobutane/olefin mole ratio, based on relative amounts of olefin and isobutane introduced into the alkylation reactor, of about 10:1 to about 20:1. This increased recycle rate of isobutane also provides a hydrogen fluoride/hydrocarbon volume ratio based on introduction of the materials to the reactor, of about 1:1 to about 2:1. Simultaneously, the temperature in the alkylation reactor is reduced to a level employed during conventional alkylation operations, i.e., a level of from about 50° F. to about 110° F. At this time, the alkylation unit is considered to be in conventional, continuous alkylation operation at alkylation conditions.

Alkylation conditions, in addition to an isobutane/olefin ratio of about 10:1 to about 20:1 and a reactor temperature of from about 50° F. to about 110° F. also include a residence time in the alkylation reactor of about 5 minutes to about 20 minutes and a catalyst/hydrocarbon volume ratio in the alkylation reactor of about 1:1 to about 2:1. Thus, continuous, normal alkylation conditions include the rate of recycle of isobutane to the alkylation reactor from the isobutane stripper which is necessary to maintain a relatively high isobutane/olefin ratio as desired in normal operations. The isobutane recycle rate maintained at alkylation conditions is generally at least about 10 times the rate of which $C_3$–$C_5$ olefins are charged to the alkylation reactor during normal continuous operation of a particular unit. The absolute amount of isobutane to be recycled depends on the size of the particular unit. A particularly preferred reactor temperature using an isobutane/olefin ratio of about 10:1 to about 20:1, especially when the olefin feed contains primarily butenes, is from about 75° to about 100° F.

ILLUSTRATIVE EMBODIMENT

A conventional hydrogen fluoride alkylation unit having a normal operational capacity of about 4500 barrels per day of alkylate is started up after a complete shut-down and removal of all hydrocarbons and catalyst from the unit. In the first, drying step of start up utilizing the process of the present invention, conventional isobutane feed is passed into the alkylation unit and circulated through the alkylation reactor, settler and isobutane stripper, as well as the other conventional vessels and lines in the alkylation unit. The isobutane in circulation is recycled overhead from the isobutane stripper to the alkylation reactor at the rate of 4,100 moles per hour, approximately the same rate as is desired to be employed during continuous alkylation operation of this particular unit. Drying of the unit is accomplished by continuously passing about 10% of the isobutane withdrawn overhead from the isobutane stripper through drying means, in this case molecular sieve dryers normally utilized to dry the fresh feed to the unit, but which may in other cases be distillation dryers, alumina dryers or similar means. Regular analysis is periodically made of the water content of the circulating isobutane in the unit, and drying of the unit is considered to be sufficient when water content of the circulating isobutane is below about 100 parts per million. This is accomplished in ten days in this particular operation. When the water level in the circulating isobutane is sufficiently low, sufficient fresh, essentially pure hydrogen fluoride is introduced into the reactor-settler system, and continuously circulated therethrough, to provide a hydrogen fluoride/isobutane volume ratio of about 1.5:1, based on the volumes of hydrogen fluoride and isobutane charged to the alkylation reactor per unit time. Sufficient hydrogen fluoride is charged to the alkylation unit at this time to provide essentially all of the catalyst requirements for continuous operation of the unit. When introduction of hydrogen fluoride to the alkylation unit is completed, the rate of isobutane recycle to the alkylation reactor is lowered to a level of about 500 moles per hour by recycling about 90% of the overhead from the isobutane stripper directly back into the isobutane stripper at an intermediate point in the isobutane stripper column, and removing some isobutane from the alkylation unit to storage. The charging of olefin feed stock to the alkylation reactor is then begun, at the rate of 375 moles of olefins per hour, the temperature in the alkylation reactor is maintained at 150° F., and sufficient pressure is maintained to provide liquid phase operations in the reactor at this temperature. Continuous operation of the alkylation unit at these high temperature, low isobutane recycle conditions is continued for 8 hours. The hydrogen fluoride catalyst in circulation is then analyzed and found to comprise about 90 weight percent hydrogen fluoride, about 9 weight percent organic materials soluble in the acid and about 1 weight percent water. The temperature in the alkylation reactor is then lowered to 80° F., fresh isobutane feed to the alkylation reactor is commenced and the isobutane recycle rate from a isobutane stripper to the alkylation reactor is increased to the conventional operating level of 4500 moles per hour, the same as was used during drying of the unit. Continuous, conventional alkylation operation of the unit is thus commenced at the conditions specified. Conventional alkylation operation of this particular unit includes an isobutane/olefin mole ratio (based on relative amounts of these materials charged to the alkylation reactor) of about 12:1, and acid/hydrocarbon volume ratio of about 1.5:1, a reactor temperature of about 80° F., and a pressure sufficient to provide liquid hydrocarbon and catalyst phases in the alkylation reactor. About 375 moles per hour of alkylate product ($C_5$ and heavier hydrocarbons) are recovered as a bottoms product from the isobutane stripper during conventional operation of the unit. The alkylate produced during the first two weeks of operation is analyzed and found to have octane ratings as high as those available in alkylate previously produced by this unit only after several months of operation subsequent to conventional start ups of this particular unit. The octane ratings of the alkylate produced during the first two weeks after start up by the method of the present invention are found to be several numbers higher than the ratings of alkylate produced in this unit during the first two weeks after start up of the unit by conventional methods.

From the foregoing description and illustration, it is apparent that the start up method of the present invention provides a superior and convenient method for insuring that conventional hydrogen fluoride alkylation units are capable of producing high octane alkylate products during initial alkylation operations after start up. This is in contrast to previously employed start up procedures, which have been found incapable of enabling production of optimum alkylation conditions in conventional alkylation units, and incapable of enabling production of sufficiently high quality alkylate in conventional operations without several weeks of low quality operation after start up of the units.

I claim as my invention:

1. A method for starting up a continuous hydrogen fluoride alkylation system to produce an alkylation reaction product from isobutane and a $C_3$–$C_5$ olefin using hydrogen fluoride catalyst, which comprises the steps of:

(a) drying said alkylation system at drying conditions which include continuously passing isobutane into and through units of said alkylation system comprising an alkylation reactor, a settler, and an isobutane stripper, by continuously recycling isobutane from the stripper to the reactor until the isobutane recycle rate is about equal to the isobutane recycle rate maintained during said alkylation reaction in said reactor;

(b) continuously circulating hydrogen fluoride through said reactor and said settler at a rate of about 1 volume to about 2 volumes of hydrogen fluoride per volume of isobutane being recycled to said reactor;

(c) separating hydrogen fluoride from isobutane in said settler and recycling hydrogen fluoride from said settler to said reactor;

(d) reducing the isobutane recycle rate to said reactor from said isobutane stripper to about 5 vol. percent to about 50 vol. percent of the isobutane recycle rate employed in step (a);

(e) continuously introducing a $C_3$–$C_5$ olefin into said reactor for about 0.1 hour to about 48 hours at a rate sufficient to provide an isobutane/olefin mole ratio of about 1:1 to about 5:1 in said reactor while maintaining a temperature of from about 115° F. to about 200° F. and the same hydrogen fluoride recycle rate as in step (b) and the isobutane recycle rate as in step (b); and (f) reducing the temperature in said reactor to a level of from about 50° F. to about 110° F., increasing the isobutane recycle rate to said reactor to the level employed in step (a) while maintaining the same rate of circulation of hydrogen fluoride and the same rate of introduction of said olefin to said reactor as employed in step (e), and commencing continuous alkylation operation of said system.

2. A process according to Claim 1 wherein said $C_3$–$C_5$ olefin is selected from butene-1, butene-2 and isobutylene.

3. A process according to Claim 1 wherein the temperature maintained in said reactor in step (e) is from about 125° F. to about 175° F.

4. A process according to Claim 1 wherein the temperature maintained in said reactor in step (f) is from about 75° F. to about 100° F.

References Cited

UNITED STATES PATENTS 3,097,155   7/1963   Friedman et al. ____ 260—683.48

DELBERT E. GANTZ, Primary Examiner

G. J. CRASANAKIS, Assistant Examiner